(12) United States Patent
Abraham

(10) Patent No.: US 6,973,407 B1
(45) Date of Patent: Dec. 6, 2005

(54) METHOD AND SYSTEM FOR CAPTURING DATA TO CREATE SERIAL ATA EYE DIAGRAM

(75) Inventor: Moby Abraham, Duluth, GA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/844,686

(22) Filed: May 13, 2004

(51) Int. Cl.[7] ............................................. G01R 13/02
(52) U.S. Cl. ........................... 702/122; 702/66; 702/67
(58) Field of Search ........................... 702/122, 66, 67, 702/69, 73, 79, 57, 108, 117, 121, 124, 189, 702/190; 375/228, 224, 226

(56) References Cited

U.S. PATENT DOCUMENTS 6,871,152 B2 *  3/2005  Nygaard, Jr. ................. 702/67
6,909,980 B2 *  6/2005  Fernando ..................... 702/66
2004/0215421 A1 * 10/2004  Schmitz et al. .............. 702/183

* cited by examiner

Primary Examiner—Hal Wachsman
(74) Attorney, Agent, or Firm—Suiter West Swantz PC LLO

(57) ABSTRACT

The present invention provides a method for capturing data suitable for creating a Serial ATA eye diagram. A Serial ATA host controller including a first and a second Serial ATA ports is powered up, where receive lines of the first Serial ATA port are short-circuited to receive lines of the second Serial ATA port, and the first Serial ATA port is communicatively coupled to a Serial ATA drive. An initialization pattern from the Serial ATA drive is received by the first and the second Serial ATA ports. An ALIGN/SYNC pattern is transmitted over transmit lines of the second Serial ATA port. Data transmitted over the transmit lines of the second Serial ATA port is captured using a high impedance differential probe and an oscilloscope. The captured data may be used to create a Serial ATA eye diagram for the second Serial ATA port on the oscilloscope.

21 Claims, 4 Drawing Sheets

METHOD AND SYSTEM FOR CAPTURING DATA TO CREATE SERIAL ATA EYE DIAGRAM

FIELD OF THE INVENTION

This invention relates generally to the field of Serial ATA, and particularly to a method and system for capturing data to create a Serial ATA eye diagram.

BACKGROUND OF THE INVENTION

Serial ATA (Advanced Technology Attachment) is an evolutionary replacement for the Parallel ATA physical storage interface. Serial ATA is a computer bus primarily designed for transfer of data between a computer processor and hard disk and has at least three advantages over Parallel ATA, namely speed, cable management, and Serial ATA's ability of being hot swappable.

To determine the performance of a Serial ATA host controller, the first type of analysis an engineer often performs is to look at an eye diagram. The eye diagram test is used to check the signal quality of a serial stream of data and to check whether the signal transmission meets the specifications for the Serial ATA host controller. During an eye diagram test, data sent through the Serial ATA host controller is captured over a period of time and displayed in a bit over bit fashion on the screen of an oscilloscope. Standard test masks are defined on the screen and typically have an "eye" in the center in addition to regions at the top and bottom which test for overshoot/undershoot. A signal which intrudes into the mask violates the standard.

An eye diagram test conventionally requires a pattern generator which may be very expensive. Thus, it would be desirable to provide a method and system for capturing data to create a Serial ATA eye diagram without using a pattern generator.

SUMMARY OF THE INVENTION

Accordingly, the present invention is directed to a method and system for capturing data to create a Serial ATA eye diagram without using a pattern generator. In a first aspect of the present invention, a method for capturing data to create a Serial ATA eye diagram includes the following steps: (a) powering up a Serial ATA host controller including a first Serial ATA port and a second Serial ATA port, receive lines of the first Serial ATA port being short-circuited to receive lines of the second Serial ATA port, the first Serial ATA port being communicatively coupled to a Serial ATA drive; (b) receiving, by the first Serial ATA port and the second Serial ATA port, an initialization pattern from the Serial ATA drive; (c) transmitting an ALIGN/SYNC pattern over transmit lines of the second Serial ATA port; and (d) capturing data transmitted over the transmit lines of the second Serial ATA port using a high impedance differential probe and an oscilloscope, the transmit lines of the second Serial ATA port being connected to each other via a resistor of 100 ohm for specified termination, and the high impedance differential probe being communicatively coupled to the oscilloscope. The captured data may be used to create a Serial ATA eye diagram for the second Serial ATA port on the oscilloscope.

In an additional aspect of the present invention, a system for capturing data to create a Serial ATA eye diagram includes the following: (a) means for powering up a Serial ATA host controller including a first Serial ATA port and a second Serial ATA port, receive lines of the first Serial ATA port being short-circuited to receive lines of the second Serial ATA port, the first Serial ATA port being communicatively coupled to a Serial ATA drive; (b) means for receiving, by the first Serial ATA port and the second Serial ATA port, an initialization pattern from the Serial ATA drive; (c) means for transmitting an ALIGN/SYNC pattern over transmit lines of the second Serial ATA port; and (d) a high impedance differential probe and an oscilloscope for capturing data transmitted over the transmit lines of the second Serial ATA port, the transmit lines of the second Serial ATA port being connected to each other via a resistor, and the high impedance differential probe being communicatively coupled to the oscilloscope, wherein the captured data is used to create a Serial ATA eye diagram for the second Serial ATA port on the oscilloscope.

In another aspect of the present invention, a system for capturing data to create a Serial ATA eye diagram includes the following: (a) a Serial ATA host controller including a first Serial ATA port and a second Serial ATA port, receive lines of the first Serial ATA port being short-circuited to receive lines of the second Serial ATA port; (b) a Serial ATA drive, communicatively coupled to the first Serial ATA port, for transmitting an initialization pattern to the first Serial ATA port and the second Serial ATA port when the Serial ATA host controller is powered up; (c) a resistor for connecting transmit lines of the second Serial ATA port; and (d) a high impedance differential probe and an oscilloscope for capturing data transmitted over the transmit lines of the second Serial ATA port, the high impedance differential probe being communicatively coupled to the oscilloscope and the transmit lines of the second Serial ATA port, wherein the captured data is used to create a Serial ATA eye diagram for the second Serial ATA port on the oscilloscope.

In a further aspect of the present invention, a test board for testing a Serial ATA port includes the following: (a) a Serial ATA receptacle for being communicatively coupled to a first Serial ATA port of a Serial ATA host controller, transmit lines of the Serial ATA receptacle being connected to each other via a resistor; (b) a first Serial ATA plug for being communicatively coupled to a second Serial ATA port of the Serial ATA host controller, receive lines of the first Serial ATA plug being communicatively coupled to receive lines of the Serial ATA receptacle; (c) a second Serial ATA plug for being communicatively coupled to a Serial ATA drive, receive lines of the second Serial ATA plug being communicatively coupled to the receive lines of the first Serial ATA plug, and transmit lines of the second Serial ATA plug being communicatively coupled to transmit lines of the first Serial ATA plug, wherein a high impedance differential probe and an oscilloscope capture data transmitted over the transmit lines of Serial ATA receptacle to create a Serial ATA eye diagram for the first Serial ATA port on the oscilloscope when the Serial ATA host controller is powered up, the high impedance differential probe being communicatively coupled to the oscilloscope and the transmit lines of the Serial ATA receptacle.

In still a further aspect of the present invention, a system for testing a Serial ATA port of a Serial ATA host controller includes the following: (a) a Serial ATA drive; (b) a Serial ATA receptacle for being communicatively coupled to a first Serial ATA port of a Serial ATA host controller, transmit lines of the Serial ATA receptacle being connected to each other via a resistor; (c) a first Serial ATA plug for being communicatively coupled to a second Serial ATA port of the Serial ATA host controller, receive lines of the first Serial ATA plug being communicatively coupled to receive lines of the Serial ATA receptacle; (d) a second Serial ATA plug communicatively coupled to the Serial ATA drive, receive lines of the second Serial ATA plug being communicatively coupled to the receive lines of the first Serial ATA plug, and transmit lines of the second Serial ATA plug being communicatively coupled to transmit lines of the first Serial ATA plug; and (e) an oscilloscope communicatively coupled to the transmit lines of the Serial ATA receptacle via a high impedance differential probe, wherein the high impedance differential probe and the oscilloscope capture data transmitted over the transmit lines of Serial ATA receptacle for creating a Serial ATA eye diagram for the first Serial ATA port on the oscilloscope when the Serial ATA host controller is powered up.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Serial ATA is a hard disk control architecture in which data is sent to the drive in a serial fashion. The simplest data pattern that can be used for eye diagram analysis is ALIGN/SYNC data pattern which is sent over the medium when the Serial ATA host controller is connected to a Serial ATA device (e.g., a Serial ATA drive, or the like) and idle. However, since the Serial ATA host controller is connected to both the Serial ATA drive and the oscilloscope, data used for eye diagram cannot be taken from a data line while the data line is connected to the Serial ATA drive. Otherwise, the quality of the data may deteriorate.

Figure 1:
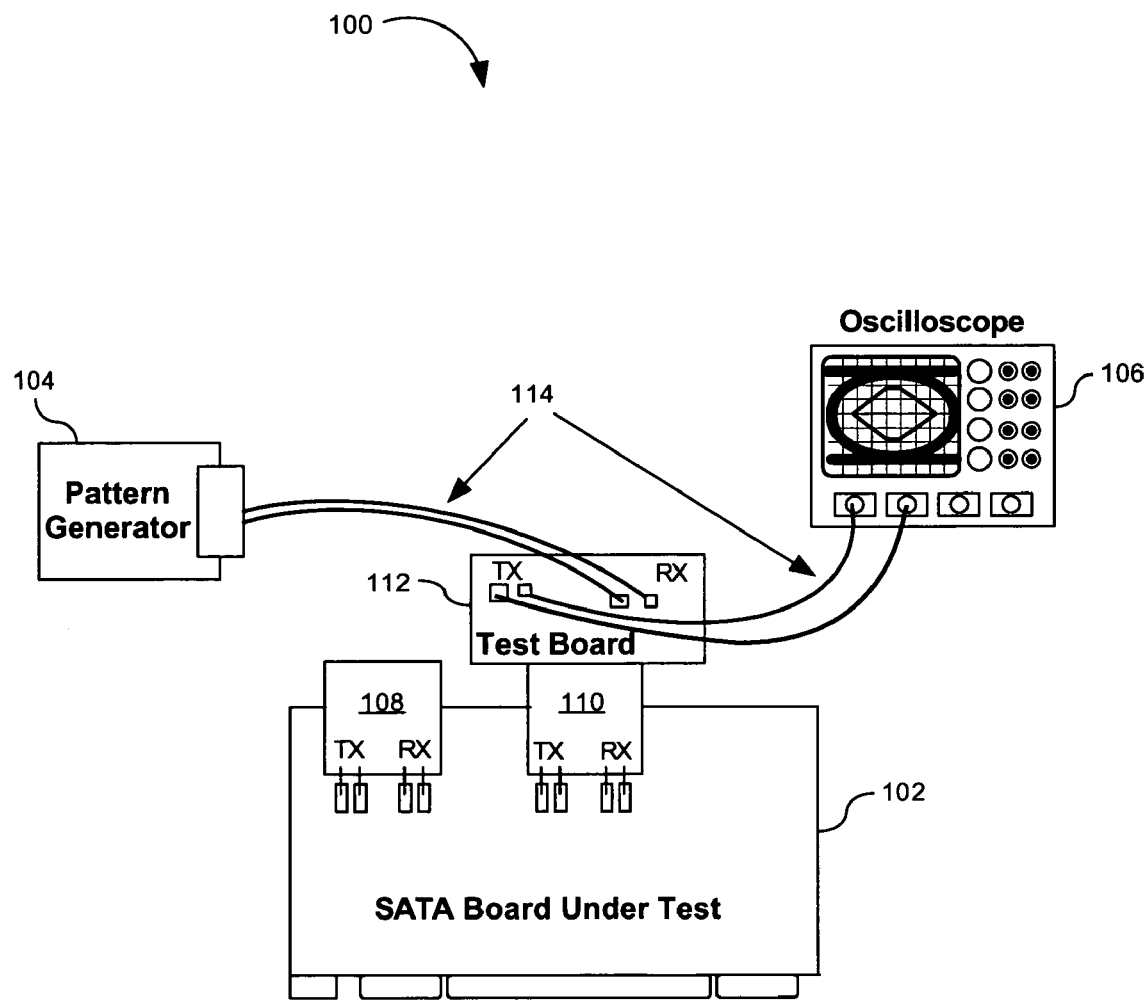
FIG. 1 is a schematic diagram illustrating a prior art system for creating a Serial ATA eye diagram using a pattern generator.

One way to transmit the ALIGN/SYNC pattern by a Serial ATA host controller is to use a pattern generator. FIG. 1 is a schematic diagram illustrating a system 100 for creating a Serial ATA eye diagram using a pattern generator. The system 100 includes a Serial ATA board such as a Serial ATA host controller 102 under test, a pattern generator 104, and an oscilloscope 106. The Serial ATA host controller 102 includes a first Serial ATA connector 108 for a first Serial ATA port and a second Serial ATA connector 110 for a second Serial ATA port which is under test. A test board 112 is communicatively coupled to the second Serial ATA port via the second Serial ATA connector 110 to test the second Serial ATA port. The transmit lines and receive lines of the Serial ATA host controller 102 (thus, the test board 112) are separated. The receive lines are connected to the pattern generator 104 that is programmed to mimic the device initialization patterns via 50 Ohm coax cables 114. The transmit lines are connected to the channels of the oscilloscope 106 via 50 Ohm coax cables 114. When the pattern generator 104 generates the device initialization pattern, the Serial ATA host controller 102 receives the initialization pattern and starts sending the ALIGN/SYNC pattern, which may be captured by the oscilloscope 106 to generate the eye diagram for the second Serial ATA port of the Serial ATA host controller 102. However, the pattern generator 104 may be very expensive. Thus, it would be desirable to provide a method and system for capturing data to create a Serial ATA eye diagram without using a pattern generator.

Figure 2:
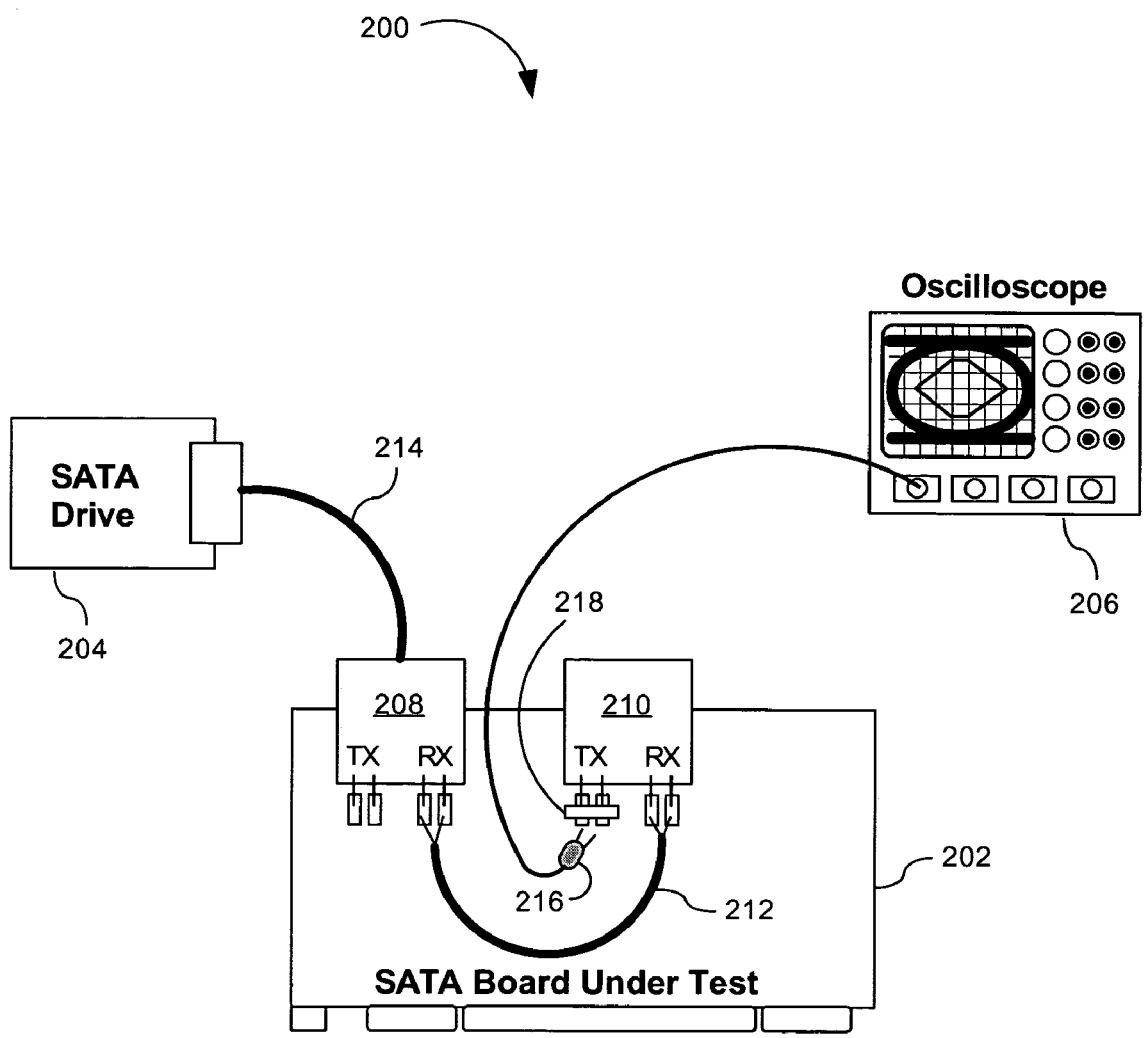
FIG. 2 is a schematic diagram illustrating a system for capturing data to create a Serial ATA eye diagram without using a pattern generator in accordance with an exemplary embodiment of the present invention.

Referring now to FIG. 2, a schematic diagram illustrating a system 200 for capturing data to create a Serial ATA eye diagram without using a pattern generator in accordance with an exemplary embodiment of the present invention is shown. The system 200 includes a Serial ATA board such as a Serial ATA host controller 202 under test, a Serial ATA drive 204, and an oscilloscope 206. The Serial ATA host controller 202 includes a first Serial ATA connector 208 for a first Serial ATA port and a second Serial ATA connector 210 for a second Serial ATA port which is under test. The first Serial port of the Serial ATA host controller 202 is communicatively coupled to the Serial ATA drive 204 through the first Serial ATA connector 208 and preferably via a differential Serial ATA cable 214. Receive lines of the first Serial ATA port are short-circuited to receive lines of the second Serial ATA port under test via a trace or cable 212 (preferably a 100 Ohm differential Serial ATA cable). Transmit lines of the second Serial ATA port are connected to each other via a resistor 218 (preferably a 100 Ohm termination resistor). The transmit lines of the second Serial ATA port are communicatively coupled to the oscilloscope 206 via a high impedance differential probe 216. When the Serial ATA host controller 202 is powered up, both the first Serial ATA port and the second Serial ATA port of the Serial ATA host controller 202 may receive the initialization pattern from the Serial ATA drive 204. The initialization pattern received by the second Serial ATA port of the Serial ATA host controller 202 may mimic the connectivity to the Serial ATA drive 204. This may result in transmission of the ALIGN/SYNC pattern over the transmit lines of the second Serial ATA port of the Serial ATA host controller 202. While the ALIGN/SYNC pattern is transmitted, the data or signal may be captured using the high impedance differential probe 216 and the oscilloscope 206. The high impedance differential probe 216 may have very high input impedance so that the data or signal under test may not be affected by the high impedance differential probe 216 too much. The captured data may be used by the oscilloscope 206 to create a Serial ATA eye diagram for the second Serial ATA port of the Serial ATA host controller 202 on the oscilloscope 206.

Figure 3:
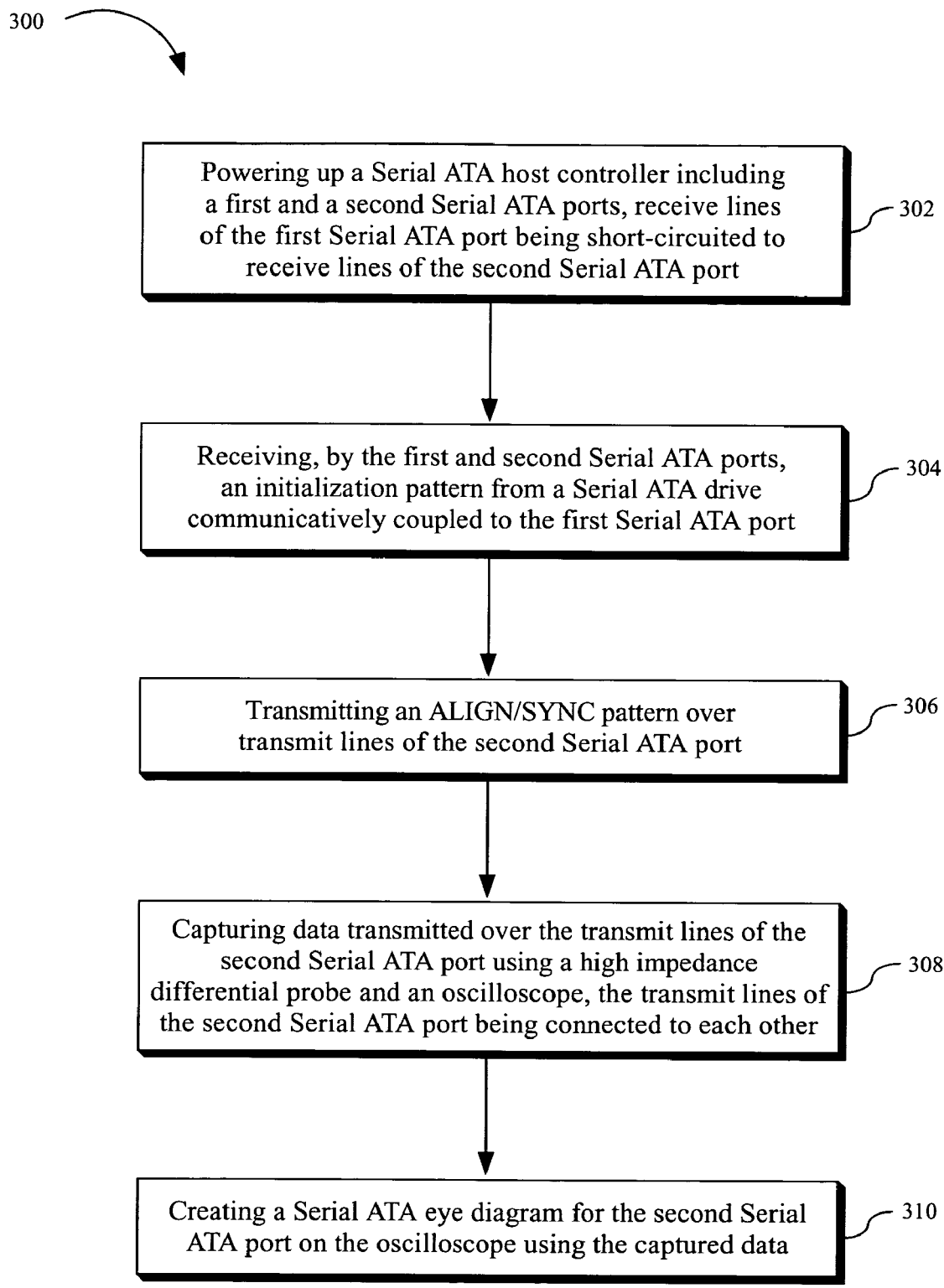
FIG. 3 is a flow chart of a method for capturing data to create a Serial ATA eye diagram in accordance with an exemplary embodiment of the present invention.

FIG. 3 is a flow chart of a method or process 300 for capturing data to create a Serial ATA eye diagram in accordance with an exemplary embodiment of the present invention. The process 300 may be implemented in the system 200 shown in FIG. 2. The process 300 may start with a step 302, in which a Serial ATA host controller including a first and a second Serial ATA ports is powered up, where receive lines of the first Serial ATA port are short-circuited to receive lines of the second Serial ATA port. The second Serial ATA port is under test. The first and second Serial ATA ports receive an initialization pattern from a Serial ATA drive communicatively coupled to the first Serial ATA port 304. An ALIGN/SYNC pattern is transmitted over transmit lines of the second Serial ATA port 306. Data transmitted over the transmit lines of the second Serial ATA port is captured using a high impedance differential probe and an oscilloscope communicatively coupled to the high impedance differential probe, where the transmit lines of the second Serial ATA port are connected to each other via a resistor 308. The captured data is used by the oscilloscope to create a Serial ATA eye diagram for the second Serial ATA port on the oscilloscope 310.

Figure 4:
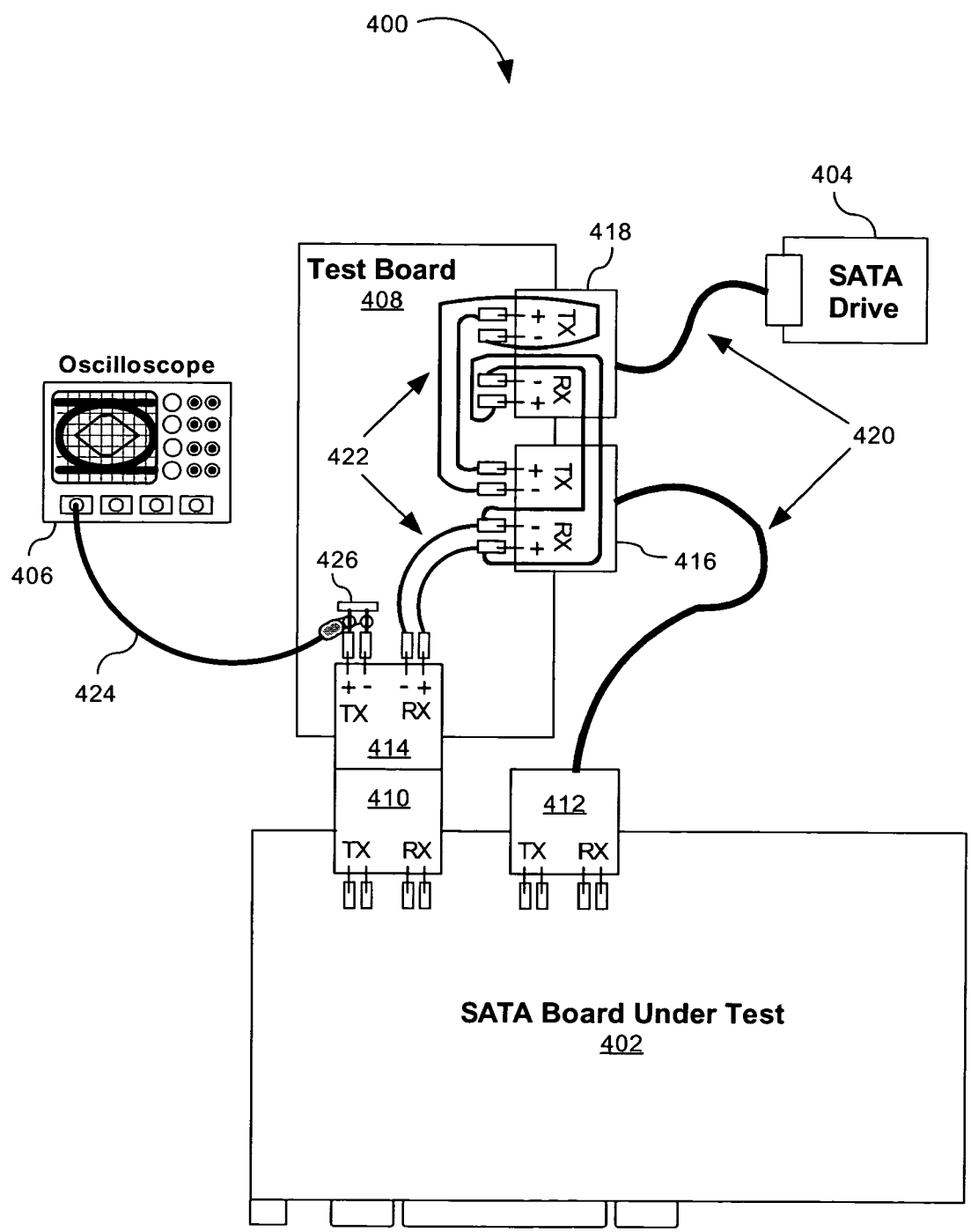
FIG. 4 is a schematic diagram illustrating a system for capturing data to create a Serial ATA eye diagram, the system including a test board in accordance with another exemplary embodiment of the present invention.

FIG. 4 is a schematic diagram illustrating a system 400 for capturing data to create a Serial ATA eye diagram in accordance with another exemplary embodiment of the present invention, where a test board 408 is used. The system 400 includes a Serial ATA board such as a Serial ATA host controller 402 under test, a Serial ATA drive 404, an oscilloscope 406, and the test board 408. The Serial ATA host controller 402 includes a first Serial ATA connector 410 for a first Serial ATA port (which is a channel under test), and a second Serial ATA connector 412 for a second Serial ATA port (which is an "Exciter" channel). The test board 408 includes a Serial ATA receptacle 414, a first Serial ATA plug 416, and a second Serial ATA plug 418. The Serial ATA receptacle 414 is communicatively coupled to the first Serial ATA port of the Serial ATA host controller 402 via the first Serial ATA connector 410. Transmit lines of the Serial ATA receptacle 414 are connected to each other via a resistor, preferably via a 100 Ohm resistor. The first Serial ATA plug 416 is communicatively coupled to the second Serial ATA port of the Serial ATA host controller 402, preferably via a differential Serial ATA cable 420. Receive lines of the first Serial ATA plug 416 are communicatively coupled to receive lines of the Serial ATA receptacle 414, preferably via 100 Ohm differential traces 422 on the test board 408. The second Serial ATA plug 418 is communicatively coupled to the Serial ATA drive 404, preferably via a differential Serial ATA cable 420. Receive lines of the second Serial ATA plug 418 are communicatively coupled to the receive lines of the first Serial ATA plug 416, and transmit lines of the second Serial ATA plug 418 are communicatively coupled to transmit lines of the first Serial ATA plug 416, preferably via 100 Ohm differential traces 422 on the test board 408. A high impedance differential probe 424, communicatively coupled to the oscilloscope 406 and the transmit lines of the Serial ATA receptacle 414, may be used in conjunction with the oscilloscope 406 to capture data transmitted over the transmit lines of Serial ATA receptacle 414 to create a Serial ATA eye diagram for the first Serial ATA port of the Serial ATA host controller 402 on the oscilloscope 406 when the Serial ATA host controller 402 is powered up.

Those of ordinary skill in the art will understand that the present invention may be used to generate eye diagrams for other devices without departing from the scope and spirit of the present invention.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for capturing data suitable for creating a Serial ATA eye diagram, comprising:
    powering up a Serial ATA host controller including a first Serial ATA port and a second Serial ATA port, receive lines of said first Serial ATA port being short-circuited to receive lines of said second Serial ATA port, said first Serial ATA port being communicatively coupled to a Serial ATA drive;
    receiving, by said first Serial ATA port and said second Serial ATA port, an initialization pattern from said Serial ATA drive;
    transmitting an ALIGN/SYNC pattern over transmit lines of said second Serial ATA port; and
    capturing data transmitted over said transmit lines of said second Serial ATA port using a high impedance differential probe and an oscilloscope, said transmit lines of said second Serial ATA port being connected to each other via a resistor, and said oscilloscope being communicatively coupled to said high impedance differential probe.

2. The method of claim 1, wherein said first Serial ATA port is communicatively coupled to said Serial ATA drive via a differential Serial ATA cable.

3. The method of claim 1, wherein said receive lines of said first Serial ATA port are short-circuited to said receive lines of said second Serial ATA port via a 100 Ohm differential Serial ATA cable.

4. The method of claim 1, wherein said resistor is a 100 Ohm termination resistor.

5. The method of claim 1, further comprising creating a Serial ATA eye diagram for said second Serial ATA port on said oscilloscope using said captured data.

6. A system for capturing data to create a Serial ATA eye diagram, comprising:
    means for powering up a Serial ATA host controller including a first Serial ATA port and a second Serial ATA port, receive lines of said first Serial ATA port being short-circuited to receive lines of said second Serial ATA port, said first Serial ATA port being communicatively coupled to a Serial ATA drive;
    means for receiving, by said first Serial ATA port and said second Serial ATA port, an initialization pattern from said Serial ATA drive;
    means for transmitting an ALIGN/SYNC pattern over transmit lines of said second Serial ATA port; and
    a high impedance differential probe and an oscilloscope for capturing data transmitted over said transmit lines of said second Serial ATA port, said transmit lines of said second Serial ATA port being connected to each other via a resistor, and said oscilloscope being communicatively coupled to said high impedance differential probe, wherein said captured data is used to create a Serial ATA eye diagram for said second Serial ATA port on said oscilloscope.

7. The system of claim 6, wherein said first Serial ATA port is communicatively coupled to said Serial ATA drive via a differential Serial ATA cable.

8. The system of claim 6, wherein said receive lines of said first Serial ATA port are short-circuited to said receive lines of said second Serial ATA port via a 100 Ohm differential Serial ATA cable.

9. The system of claim 6, wherein said resistor is a 100 Ohm termination resistor.

10. A system for capturing data to create a Serial ATA eye diagram, comprising:
   a Serial ATA host controller including a first Serial ATA port and a second Serial ATA port, receive lines of said first Serial ATA port being short-circuited to receive lines of said second Serial ATA port;
   a Serial ATA drive, communicatively coupled to said first Serial ATA port, for transmitting an initialization pattern to said first Serial ATA port and said second Serial ATA port when said Serial ATA host controller is powered up;
   a resistor for connecting transmit lines of said second Serial ATA port; and
   a high impedance differential probe and an oscilloscope for capturing data transmitted over said transmit lines of said second Serial ATA port, said high impedance differential probe being communicatively coupled to said transmit lines of said second Serial ATA port, and said oscilloscope being communicatively coupled to said high impedance differential probe,
   wherein said captured data is used to create a Serial ATA eye diagram for said second Serial ATA port on said oscilloscope.

11. The system of claim 10, wherein said first Serial ATA port is communicatively coupled to said Serial ATA drive via a differential Serial ATA cable.

12. The system of claim 10, wherein said receive lines of said first Serial ATA port are short-circuited to said receive lines of said second Serial ATA port via a 100 Ohm differential Serial ATA cable.

13. The system of claim 10, wherein said resistor is a 100 Ohm termination resistor.

14. A test board for testing a Serial ATA port, comprising:
   a Serial ATA receptacle for being communicatively coupled to a first Serial ATA port of a Serial ATA host controller, transmit lines of said Serial ATA receptacle being connected to each other via a resistor;
   a first Serial ATA plug for being communicatively coupled to a second Serial ATA port of said Serial ATA host controller, receive lines of said first Serial ATA plug being communicatively coupled to receive lines of said Serial ATA receptacle; and
   a second Serial ATA plug for being communicatively coupled to a Serial ATA drive, receive lines of said second Serial ATA plug being communicatively coupled to said receive lines of said first Serial ATA plug, and transmit lines of said second Serial ATA plug being communicatively coupled to transmit lines of said first Serial ATA plug,
   wherein a high impedance differential probe and an oscilloscope capture data transmitted over said transmit lines of Serial ATA receptacle to create a Serial ATA eye diagram for said first Serial ATA port on said oscilloscope when said Serial ATA host controller is powered up, said high impedance differential probe being communicatively coupled to said oscilloscope and said transmit lines of said Serial ATA receptacle.

15. The test board of claim 14, wherein said first Serial ATA plug is communicatively coupled to said second Serial ATA port of said Serial ATA host controller via a differential Serial ATA cable.

16. The test board of claim 14, wherein said second Serial ATA plug is communicatively coupled to said Serial ATA drive via a differential Serial ATA cable.

17. The test board of claim 14, wherein said resistor is a 100 ohm resistor.

18. The test board of claim 14, wherein said receive lines of said first Serial ATA plug are communicatively coupled to said receive lines of said Serial ATA receptacle via 100 Ohm differential traces on said test board.

19. The test board of claim 14, wherein said receive lines of said second Serial ATA plug are communicatively coupled to said receive lines of said first Serial ATA plug via 100 Ohm differential traces on said test board.

20. The test board of claim 14, wherein said transmit lines of said second Serial ATA plug are communicatively coupled to said transmit lines of said first Serial ATA plug via 100 Ohm differential traces on said test board.

21. A system for testing a Serial ATA port of a Serial ATA host controller, comprising:
   a Serial ATA drive;
   a Serial ATA receptacle for being communicatively coupled to a first Serial ATA port of a Serial ATA host controller, transmit lines of said Serial ATA receptacle being connected to each other via a resistor;
   a first Serial ATA plug for being communicatively coupled to a second Serial ATA port of said Serial ATA host controller, receive lines of said first Serial ATA plug being communicatively coupled to receive lines of said Serial ATA receptacle;
   a second Serial ATA plug communicatively coupled to said Serial ATA drive, receive lines of said second Serial ATA plug being communicatively coupled to said receive lines of said first Serial ATA plug, and transmit lines of said second Serial ATA plug being communicatively coupled to transmit lines of said first Serial ATA plug; and
   an oscilloscope communicatively coupled to said transmit lines of said Serial ATA receptacle via a high impedance differential probe,
   wherein said high impedance differential probe and said oscilloscope capture data transmitted over said transmit lines of Serial ATA receptacle for creating a Serial ATA eye diagram for said first Serial ATA port on said oscilloscope when said Serial ATA host controller is powered up.

* * * * *